Jan. 18, 1955    G. KLEMT    2,699,700
VIEW FINDER SYSTEM WITH ADJUSTABLE MAGNIFICATION
Filed March 15, 1951
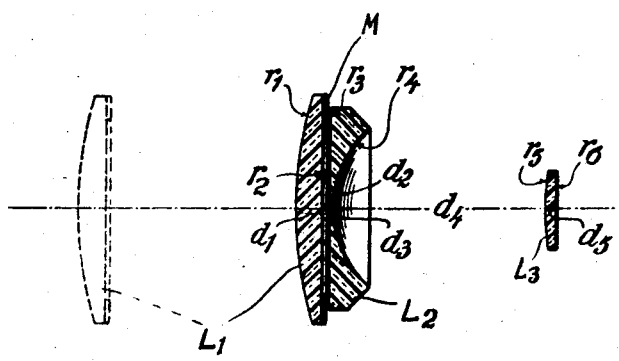
INVENTOR.
G. Klemt
BY
Karl F. Ross
AGENT

United States Patent Office 2,699,700
Patented Jan. 18, 1955

2,699,700

VIEW FINDER SYSTEM WITH ADJUSTABLE MAGNIFICATION

Günter Klemt, Kreuznach, Germany, assignor to Jos. Schneider & Co., Kreuznach, Germany Application March 15, 1951, Serial No. 215,749

Claims priority, application Germany April 11, 1950

2 Claims. (Cl. 88—1.5)

The present invention relates to a view finder system with adjustable magnification for use in photographic or motion picture cameras.

View finders of the character herein contemplated, consisting of three lens members of which the outer ones are positive lenses and the central one is a negative one, are well known. They may be regarded as an inversion of Galileo's telescope and are sometimes referred to as Newton view finders; they may have fixed or variable magnification and have heretofore been employed almost exclusively for narrow-film or miniature picture cameras. Thus, in the case of a 16 mm. film camera the view finder must be adaptable to focal lengths ranging from about 16 mm. to 75 mm., corresponding to field angles on the object side varying from approximately 42° to 9°. When the finder is used with a 24 x 36 mm. picture camera, the focal length varies from 35 mm. to 135 mm. and the field angle, correspondingly, from 62° to 18°.

Whereas the problems arising in the instances referred to were not too difficult of solution with the aid of view finders of the type heretofore known, it soon became apparent that the same was no longer true for cameras of larger size. In the case of groundglass cameras of the 90 x 120 mm. size, for example, focal lengths ranging from 90 mm. to 360 mm. are being used, corresponding to field angles on the object side varying from 80° to 24°. Conventional view finders of the character set forth, when adapted to these conditions, became unduly bulky and gave rise to objectionable image distortion.

The general object of the present invention is, therefore, to provide a view finder system of the general character described which may be adapted to larger-size cameras while avoiding the disadvantages heretofore encountered, and wherein more particularly the bulkiness and the tendency to distortion are substantially eliminated.

In accordance with a feature of this invention there is provided a three-element view finder wherein the second (negative) lens consists of a material having an index of refraction greater than 1.6.

According to another feature of the invention the view finder may include masking means provided on one of the faces of the first, variably positionable lens member.

An embodiment of the invention is shown, somewhat schematically, in the sole figure of the accompanying drawing.

The view finder shown in the drawing comprises a first, positive lens $L_1$ having a thickness $d_1$ and radii of curvature $r_1$, $r_2$; a second, negative lens $L_2$ having a thickness $d_3$ and radii of curvature $r_3$, $r_4$; and a third, positive lens $L_3$ having a thickness $d_5$ and radii of curvature $r_5$, $r_6$. The spacing between the lenses $L_1$ and $L_2$ has been designated $d_2$ and is variable, as shown by the alternative, dotted-line position of lens $L_1$, while the distance between the lenses $L_2$ and $L_3$ has been designated $d_4$ and is assumed to be fixed.

An image-limiting mask M is provided on one of the faces of the movable lens member $L_1$; as here shown by way of example, this mask is carried by the inner face of the lens which has been illustrated as plane $r_2 = \infty$).

Representative values of the parameters $r$ and $d$ shown in the drawing, as well as of the indices of refraction $n_1$, $n_2$ and $n_3$ of the three lenses $L_1$, $L_2$ and $L_3$, have been given, by way of example, in the following table, taking the thickness $d_3$ of the central member $L_2$ as unity:

$L_1$  $r_1 = +77.0$      $d_1 = 5.5$    $n_1 = 1.516$
       $r_2 = \infty$
                          $d_2 \geqq 0.8$ (minimum)
       $r_3 = \infty$
$L_2$                     $d_3 = 1.0$    $n_2 = 1.623$
       $r_4 = +21.0$
                          $d_4 = 42.0$ (fixed)
       $r_5 = +48.0$
$L_3$                     $d_5 = 2.0$    $n_3 = 1.516$
       $r_6 = \infty$ It should be understood that departures from the specific arrangement illustrated and from the precise values given above are possible within the spirit of the invention and without exceeding its scope as defined in the appended claims.

What is claimed is:

1. A view finder system with adjustable magnification, comprising a first, positive lens member, a second, negative lens member and a third, positive lens member, the distance between said first and said second lens member being variable, the distance between said second and said third lens member being fixed, the radii of curvature $r_1$, $r_2$, the thickness $d_1$ and the index of refraction $n_1$ of said first lens member $L_1$, the radii of curvature $r_3$, $r_4$, the thickness $d_3$ and the index of refraction $n_2$ of said second lens member $L_2$, and the radii of curvature $r_5$, $r_6$, the thickness $d_5$ and the index of refraction $n_3$ of said third lens member $L_3$ having numerical values, based upon a value of unity for said thickness $d_3$, substantially as given in the following table:

$L_1$:  $r_1 = +77$       $d_1 = 5.5$    $n_1 = 1.516$
        $r_2 = \infty$
$L_2$:  $r_3 = \infty$    $d_3 = 1.0$    $n_2 = 1.623$
        $r_4 = +21$
$L_3$:  $r_5 = +48$       $d_5 = 2.0$    $n_3 = 1.516$
        $r_6 = \infty$ the numerical value of said fixed distance being substantially 42, the distance between said first and second lens members being variable between a value of the order of said fixed distance and a fraction thereof.

2. A view finder system according to claim 1, further including masking means provided on one of the faces of said first lens member.

References Cited in the file of this patent

UNITED STATES PATENTS

| Number | Name | Date |
|---|---|---|
| 2,043,900 | Mihalyi | June 19, 1936 |
| 2,105,256 | Mihalyi | Jan. 11, 1938 |
| 2,250,337 | Warmisham | July 22, 1941 |
| 2,353,565 | Kaprelian | July 11, 1944 |
| 2,578,574 | Miles | Dec. 11, 1951 |